United States Patent
Frederick, Jr.

(10) Patent No.: US 10,204,894 B2
(45) Date of Patent: Feb. 12, 2019

(54) VIA PLACEMENT WITHIN AN INTEGRATED CIRCUIT

(71) Applicant: ARM Limited, Cambridge (GB)

(72) Inventor: Marlin Wayne Frederick, Jr., Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/259,256

(22) Filed: Sep. 8, 2016

(65) Prior Publication Data

US 2017/0062404 A1    Mar. 2, 2017

Related U.S. Application Data

(62) Division of application No. 14/307,565, filed on Jun. 18, 2014, now Pat. No. 9,454,633.

(51) Int. Cl.
| | | |
|---|---|---|
| H01L 23/52 | (2006.01) | |
| H01L 21/4763 | (2006.01) | |
| G06F 17/50 | (2006.01) | |
| H01L 27/02 | (2006.01) | |
| H01L 23/528 | (2006.01) | |
| H01L 21/768 | (2006.01) | |
| H01L 23/522 | (2006.01) | |

(52) U.S. Cl.
CPC ...... *H01L 27/0207* (2013.01); *G06F 17/5068* (2013.01); *G06F 17/5077* (2013.01); *G06F 17/5081* (2013.01); *H01L 21/76816* (2013.01); *H01L 21/76877* (2013.01); *H01L 23/5226* (2013.01); *H01L 23/5286* (2013.01); *H01L 27/0203* (2013.01); *G06F 2217/06* (2013.01); *H01L 2924/0002* (2013.01)

(58) Field of Classification Search
CPC ............ H01L 27/0207; H01L 23/5286; H01L 27/0203; G06F 17/5068; G06F 17/5077; G06F 17/5081
USPC ......... 257/691, 207, 211, E23.153; 716/126, 716/127, 122; 438/622
See application file for complete search history.

(56) References Cited

U.S. PATENT DOCUMENTS

| | | | |
|---|---|---|---|
| 2004/0039520 A1 | 2/2004 | Khavakh et al. | |
| 2004/0044983 A1* | 3/2004 | Dillon | G06F 17/5068 430/5 |
| 2009/0026503 A1* | 1/2009 | Tsuda | H01L 27/0207 257/211 |

OTHER PUBLICATIONS

U.S. Appl. No. 14/307,565, filed Jun. 18, 2014, Inventor: Frederick Jr.
Office Action dated Nov. 18, 2015 in co-pending U.S. Appl. No. 14/307,565, 10 pages.
Office Action dated Sep. 14, 2018 in TW Application No. 104114172 and English translation, 11 pages.

* cited by examiner

*Primary Examiner* — Fernando L Toledo
*Assistant Examiner* — Aaron Gray
(74) *Attorney, Agent, or Firm* — Nixon & Vanderhye P.C.

(57) ABSTRACT

An integrated circuit layout includes a routing layout of routing conductors and routing connection vias formed prior to a power grid connection which forms power connection vias between power grid conductors and standard-power cell conductors within the standard cells. This enables a minimum via spacing requirement to be met while permitting an increased flexibility in the positioning of the routing connection vias.

12 Claims, 5 Drawing Sheets

VIA PLACEMENT WITHIN AN INTEGRATED CIRCUIT

CROSS-REFERENCE

This application is a divisional of U.S. application Ser. No. 14/307,565 filed Jun. 18, 2014, the entire contents of which are incorporated herein by reference in this application.

BACKGROUND

This invention relates to the field of integrated circuits. More particular, this invention relates to the forming of layouts for integrated circuits and the placement of vias between conductors within layouts of integrated circuits.

It is known to form layouts of integrated circuits using a library of standard cells and a system of tools responsive to both design rules for a target manufacturing process and a functional description of the integrated circuit to be formed (e.g. a registered transfer language (RTL) description of the integrated circuit) to form masks for use in manufacturing the integrated circuit. Typically the power grid to be used to provide power to the standard cells of the integrated circuit is set out during a floor planning stage of the integrated circuit synthesis. This power grid typically includes both the conductors and vias which belong to the power grid. These vias connect between power grid conductors in one layer and standard-cell power conductors in a different layer which connect the different portions of the standard cells to the power supply.

One of the design rules associated with a manufacturing process is a minimum via spacing requirement. In some processes this minimum via spacing requirement may correspond to a minimum via separation which is greater than the minimum separation between conductors (tracks/wires) which are used for power supply and signal routing. Thus, the minimum via spacing requirement can limit the freedom of position along a conductor at which a via may be placed due to the presence of vias within neighbouring conductors.

SUMMARY

Viewed from one aspect the present technique provides a method of forming a layout of an integrated circuit having:

a plurality of standard cells connected to draw power from standard-cell power conductors in a standard-cell conductor layer; and a plurality of power grid conductors disposed overlapping at least portions of said plurality standard-cell power conductors in a further layer separate from said standard-cell conductor layer, said method comprising the steps of:

a routing step forming a routing layout of routing conductors and routing connection vias to connect different portions of said plurality of standard cells; and subsequent to said routing step, a power grid connection step forming a power connection via layout of power connection vias to connect said plurality of power grid conductors to said plurality of standard-cell power conductors, wherein said power grid connection step is responsive to positions of said routing connection vias determined in said routing step to position said power grid connection vias at positions meeting a minimum via spacing requirement from said routing connection vias.

The present technique recognises and solves a problem that can arise when power grid conductors and a power connection via layouts are formed before a routing step which provides the routing layout of the routing conductors and routing connection vias. More specifically, the presence of the power connection vias may limit the freedom to place the routing connection vias. This can cause difficulty in achieving an efficient routing solution. The present technique addresses this problem by moving the step of forming the power connection via layout until after the routing step in which the routing layout of routing conductors and routing connection vias has been formed. There is generally a greater freedom in where power connection vias may be placed and so it is easier to position the power connection vias at positions which will function satisfactorily whilst also meeting the minimum via spacing requirement than to achieve the same for the routing connection vias. This enables more efficient routing layout to be achieved.

In some embodiments the routing conductors are in the further layer which also contains the power grid conductors. The power grid conductors overlap/overlie the standard cell conductors which are in a different standard-cell conductor layer. Typically the standard-cell conductor layer may be a metal one layer in the integrated circuit and the further layer, which contains both the power grid conductors and the routing conductors, may be a metal two layer.

As previously mentioned, the power grid connection step is responsive to the positions of the routing connection vias to position the power grid connection vias. In addition, the routing conductors are formed at positions meeting a minimum conductor spacing requirement from other conductors. This can be from other routing conductors or power grid conductors which are formed in the same layer. The minimum conductor spacing requirement may in some embodiments be less than the minimum via spacing requirement.

While it will be appreciated that the various conductors can have a variety of shapes, in many modern small geometries the conductors are formed as substantially parallel linear conductors as these are more reliably formed at small geometry sizes. The routing conductors, the standard-cell power conductors, and the power grid conductors may all be parallel with each other.

In some embodiments the method of forming a layout includes the step of storing computer readable data specifying the routing layout and the power connection via layout for use in manufacturing of the integrated circuit. This computer readable data may be stored in a non transitory computer readable medium. This computer readable data may be used to control the forming of one or more masks for manufacturing the integrated circuit which includes the routing layout and the power connection via layout.

Viewed from another aspect the present technique provides an integrated circuit comprising:

a plurality of standard cells connected to draw power from standard-cell power conductors in a standard-cell conductor layer;

a plurality of power grid conductors disposed overlapping at least portions of said plurality standard-cell power conductors in a further layer separate from said standard-cell conductor layer;

routing conductors and routing connection vias connecting different portions of said plurality of standard cells; and power connection vias connecting said plurality of power grid conductors to said plurality of standard-cell power conductors, wherein said power grid connection vias are disposed at positions with an non-uniform spacing between different power grid connection vias so as to meet a minimum via spacing requirement of said power grid connection vias from said routing connection vias.

A characteristic of integrated circuits formed using the above techniques may be that the power grid connection vias are disposed at positions with a non-uniformed spacing so as to meet the minimum via spacing requirement of the power grid connection vias from the routing connection vias. If the power grid connection vias are formed before the routing connection vias, then they will typically have a uniform spacing as they will not be influenced by the presence of the routing connection vias. However, when the routing connection vias have already been placed, then a non-uniform spacing between power connection vias may occur so as to avoid violating the minimum via spacing requirements.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
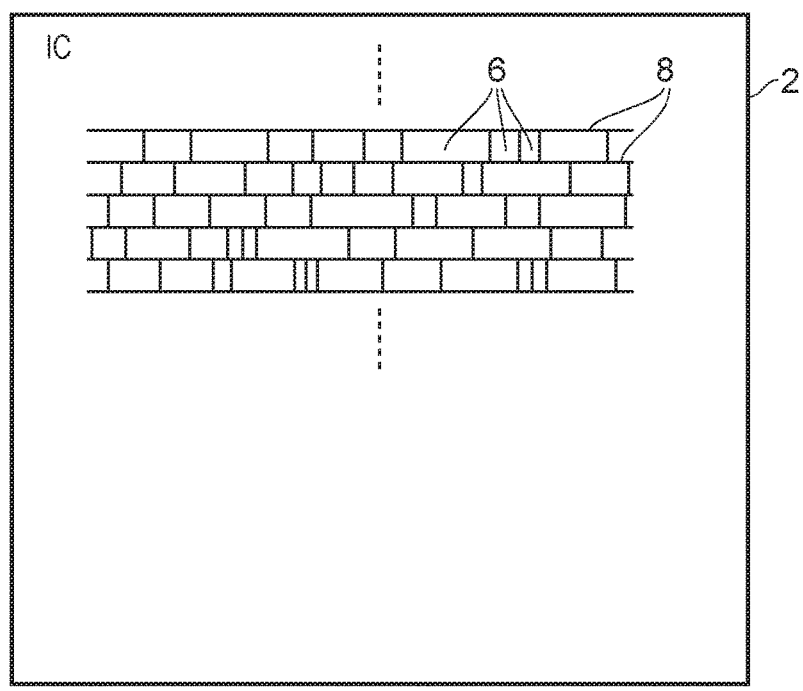
FIG. 1 schematically illustrates an integrated circuit formed using layout of a plurality of standard cells.

FIG. 1 schematically illustrates an integrated circuit 2 including a plurality of standard cells 6 laid out in an array. Power grid conductors 8 run through the integrated circuit and supply power to the standard cells. The power grid conductors provide a connection to a VDD voltage and a ground voltage.

It will be appreciated that the standard cells may have a fixed height, but varying width, e.g. the standard cells may all be the width of, for example, six tracks, or some other multiple of the track pitch P.

Figure 2:
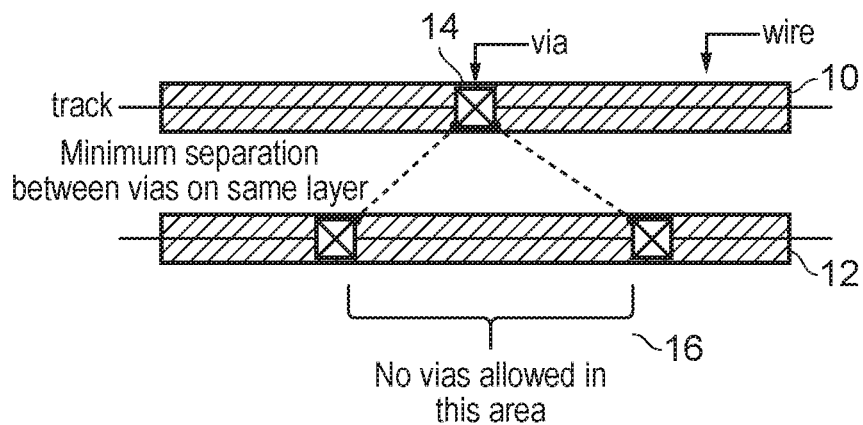
FIG. 2 schematically illustrates a minimum via spacing requirement.

FIG. 2 schematically illustrates a minimum via spacing requirement. As illustrated, two adjacent conductor (tracks/wires) 10, 12 are formed as substantially parallel linear conductors. These conductors have a minimum conductor spacing and are placed at substantially this minimum conductor spacing so as to improve the density of the integrated circuit layout. When a via 14 is placed within the conductor 10, the minimum via spacing requirement has the consequence that no vias may be placed within the conductor 12 inside the region 16. This can cause difficulty as routing connection vias may need to be placed at certain positions for an efficient standard cell layout, and yet the presence of nearby power connection vias may prohibit the placing of desired routing connection vias due to minimum via spacing requirements.

Figure 3:
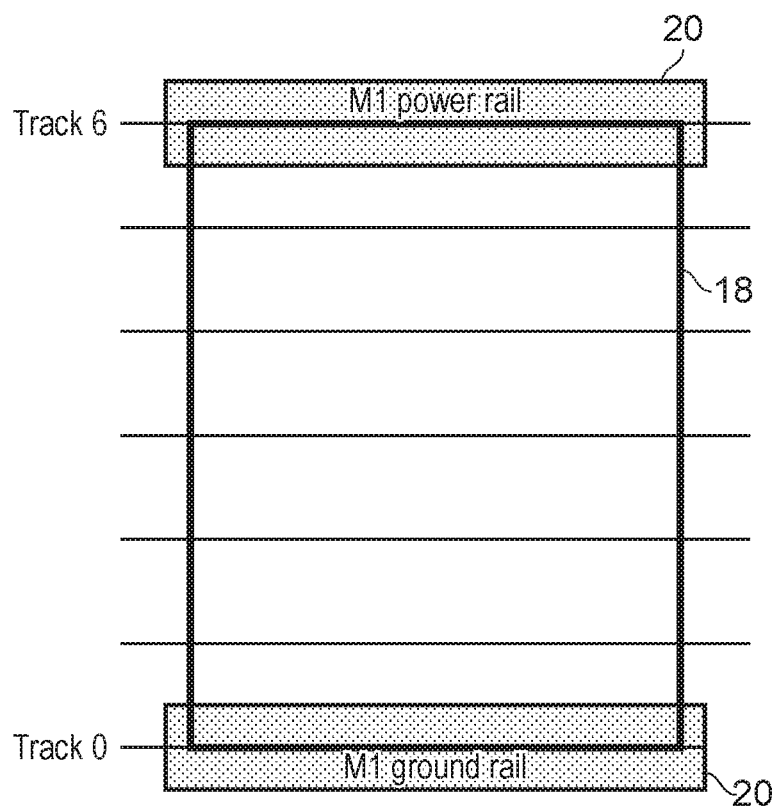
FIG. 3 schematically illustrates standard-cell power conductors for a standard cell.

FIG. 3 schematically illustrates the boundary 18 of a standard cell. Running through this standard cell are a plurality of track lines centred upon which conductors may be formed. These conductors may be at various metal layers, but formed overlying these track line positions so that connections using vias may be made between the conductors. The standard cell boundary 18 illustrated in FIG. 3 has at its upper and lower edges standard-cell power conductors 20. These are formed in a standard-cell conductor layer, which in this example is a metal one layer.

Figure 4:
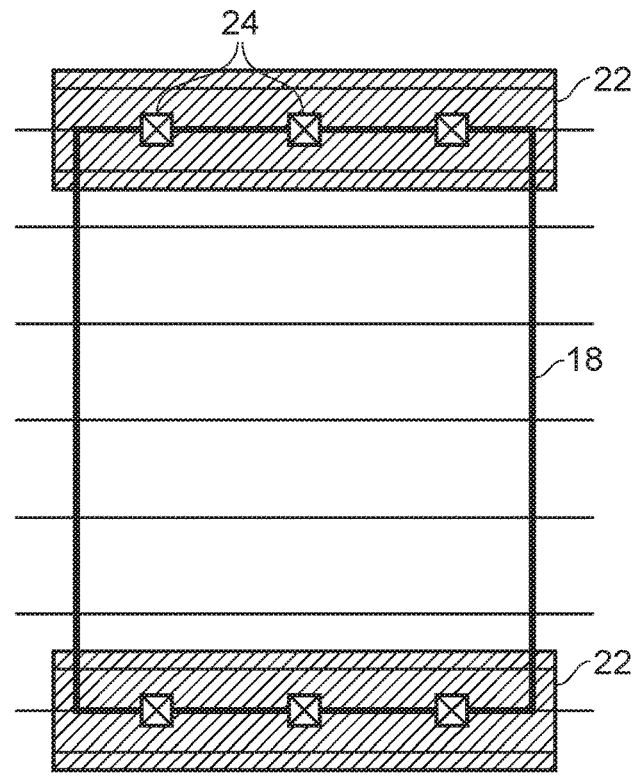
FIG. 4 schematically illustrates power grid conductors and power connection vias for a standard cell.

FIG. 4 schematically illustrates the forming of a layout including power grid conductors 22 located in a further layer (in this example a metal two layer) overlying the standard-cell power conductors 20. Power connection vias 24 may then be formed extending between the power grid conductors 22 and the standard-cell power conductors 20. Thus, power may be supplied from VDD or ground to the standard cell within the boundary 18 passing through the power grid conductors 22, the power connection vias 24, and the standard-cell power conductors 20 to reach the circuit elements within the standard cell contained inside the standard cell boundary 18.

Figure 5:
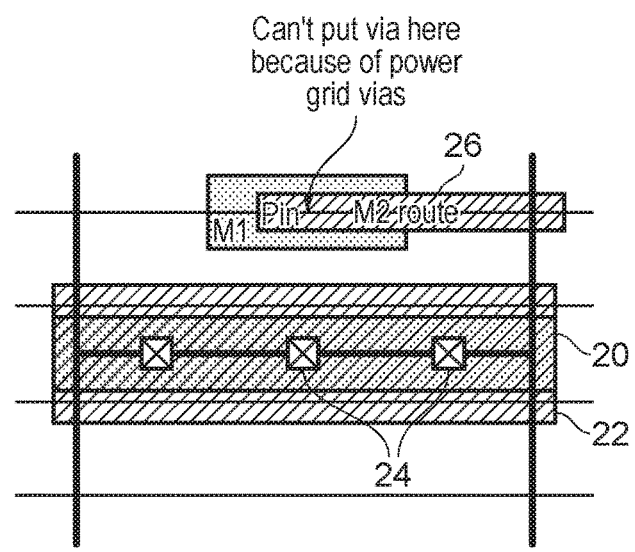
FIG. 5 schematically illustrates the minimum via spacing requirement preventing a routing connection via being formed.

FIG. 5 schematically illustrates how the minimum via spacing requirement when applied subsequent to the layout of the power connection vias being formed can limit the placement of routing connection vias at desired positions. In particular, as illustrated, power connection vias 24 have been placed to provide a connection between a power grid conductor 22 in the metal two layer and an underlying standard-cell power conductor 20 in the metal one layer. A consequence of this is that a routing conductor 26, which it is desired to place as shown so as to connect to a pin connector in the metal one layer, is not able to be provided with as desired routing connection via as this would cause a violation in the minimum via spacing requirement with respect to the power connection vias 24 which have already been placed in position.

Figure 6:
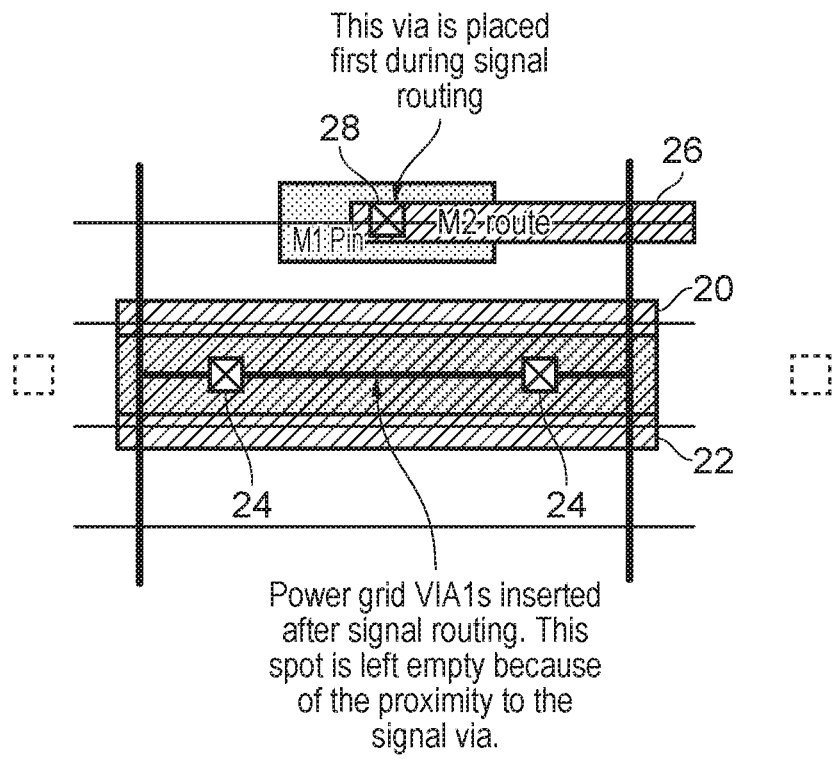
FIG. 6 schematically illustrates the minimum via spacing requirement altering the placement of power connection vias.

FIG. 6 schematically illustrates the result if the routing conductor 26 and the routing conductor via 28 are placed prior to forming the layout for the power connection vias 24. In this case, the minimum via spacing requirement has the result that it is no longer possible to place a power connection via at the central position within the power grid conductor 22, which was previously occupied by a power connection via in the example illustrated in FIG. 5. However, the omission of this power connection via is not critical as it is still sufficient to supply power using the two power connections vias 24 which can be positioned meeting the minimum via spacing requirements in the example of FIG. 6. There may be a minimum spacing requirement between the power grid connection vias themselves. This requirement may differ from the requirement previously discussed, i.e. the requirement is different when considering vias in the same net and same layer than between nets and/or between layers.

It will be seen that the various conductors (tracks/vias) illustrated in the foregoing examples have the form of substantially parallel linear conductors. These are easier to form with modern small process geometries. There is a minimum conductor spacing requirement associated with the conductors and the conductor/track pitch P is selected so as to meet this minimum conductor spacing requirement. The minimum conductor spacing requirement in this example is less than the minimum via spacing requirement.

Figure 7:
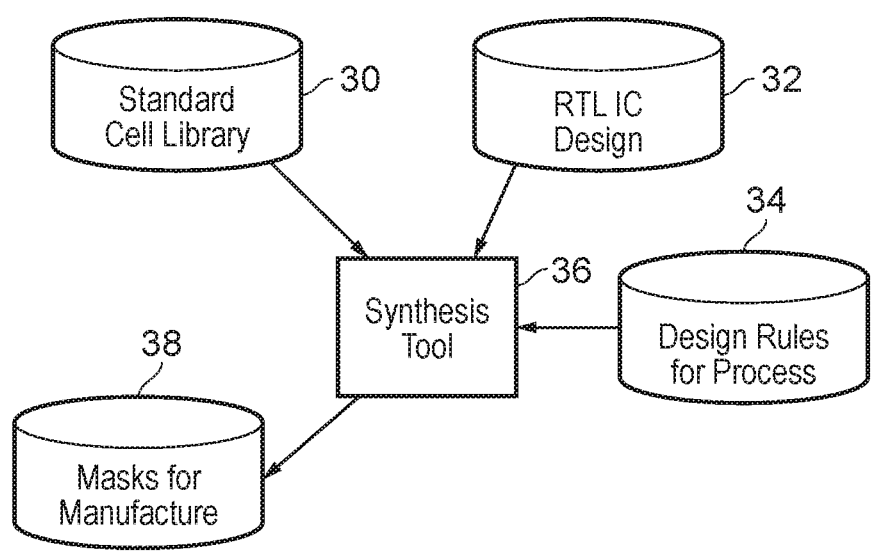
FIG. 7 schematically illustrates an electronic design automation (EDA) process for an integrated circuit.

FIG. 7 schematically illustrates an electronic design automation system. Such systems will be familiar to those in the field of integrated circuit design and manufacture. A synthesis tool, typically in the form of a computer program running on a general purpose computer, receives input in the form of a standard cell library 30, an RTL (register transfer language) design 32 and set of design rules 34. The standard cell library 30 can be considered to provide building blocks from which a functionally defined integrated circuit design, as specified in the RTL design 32, may be formed. The design rules 34 specify factors such as the minimum via spacing requirements and the minimum conductor spacing requirement as previously discussed. The design rules 34 will typically also include many further requirements. The output from the synthesis tool 36 includes masks 38 in the form of data for forming those masks. The masks are used in the manufacturing of the integrated circuit in accordance with the inputs 30, 32 and 34.

Figure 8:
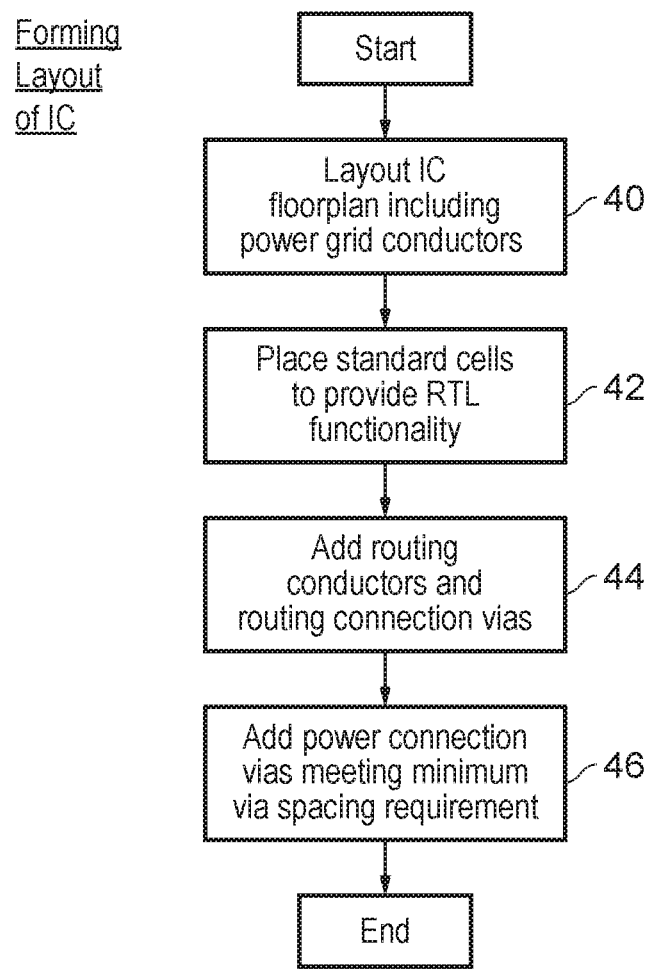
FIG. 8 is a flow diagram schematically illustrating steps within the forming of a layout of an integrated circuit.

FIG. 8 is a flow diagram schematically illustrating the forming of the layout of an integrated circuit. At step 40, the layout of the floorplan of the integrated circuit, including the layout of the power grid conductors 22, is established. At step 42 the standard cells 6 are placed in position within the floorplan so as to provide the functionality specified by the RTL design 32. At step 44 the routing conductors 26 and the routing connection vias 28 are added to the layout (this may be performed as part of a single step of all layers). At step 46 the power connection vias 24 are added meeting the minimum via specifying requirement as specified by the design rules 34. At step 48 higher and further layers and components of the layout are added.

As will be seen from FIG. 8, step 46, which adds the power connection vias 24, is performed after step 44, which adds the routing conductors and the routing connection vias 28. Accordingly, the positioning of the power connection vias 24 is responsive to the already established positions of the routing connection vias 28. This enables the positioning of the power connection vias 24 to meet the minimum via spacing requirement stated in FIG. 2.

The present technique also helps prevent design rule violations between fixed vias in the standard cell layout and power grid vias. In order to get efficient layout for some complex standard cells, it may be necessary to place a fixed via within a spacing rule violation of the power rail (via could be on the same layer or different layer of power via). Since final standard cell instance location is not known until after route also helps address this issue.

There is another via spacing rule (different-net/different-layer vs different-net/same-layer in the diagram) that can affect signal routing. The impetus for the present technique is to allow for smaller standard cell design by allowing standard cell pins to be closer to the power rails than previously allowed. It also gives the router freedom not only on the same layer as the power rail vias, but also on adjacent layers. This can improve routing not directly related to standard cell pin connections.

As illustrated in FIG. 6, when an integrated circuit is formed in accordance with the current techniques, such that the placing of the power connection vias 24 is responsive to an already established set of positions for the routing connection vias 28, this can result in a non-uniform spacing between the power connection vias. Thus, the regular spacing of the power connection vias 24 illustrated in FIG. 5 is changed to a non-uniform spacing as illustrated in FIG. 6, where there is missing via at the central position and the uniform spacing of the vias, and their neighbours (illustrated with dashed lines), is accordingly disrupted. This non-uniform distribution is an artefact of placing the power connection vias 24 subsequent to the placing of the routing connection vias 28.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus for forming a layout of an integrated circuit having:
   a plurality of standard cells connected to draw power from standard-cell power conductors in a standard-cell conductor layer; and
   a plurality of power grid conductors disposed overlapping at least portions of said standard-cell power conductors in a further layer separate from said standard-cell conductor layer,
   said apparatus being configured to:
      form a power grid layout placing said plurality of power grid conductors in said integrated circuit;
      subsequent to formation of the power grid layout, form a routing layout of routing conductors and routing connection vias to connect different portions of said plurality of standard cells; and
      subsequent to formation of the routing layout, form a power connection via layout of power connection vias to connect said plurality of power grid conductors to said plurality of standard-cell power conductors, where said power grid connection vias meeting a minimum via spacing requirement from said routing connection vias.

2. An apparatus as claimed in claim 1, wherein said routing conductors are in said further layer.

3. An apparatus as claimed claim 1, wherein said routing conductors are at positions meeting a minimum conductor spacing requirement from other conductors.

4. An apparatus as claimed in claim 3, wherein said minimum conductor spacing requirement is less than said minimum via spacing requirement.

5. An apparatus as claimed in claim 1, wherein said routing conductors comprise a plurality of substantially parallel linear routing conductors.

6. An apparatus as claimed in claim 5, wherein said plurality of power grid conductors comprise a plurality of substantially parallel linear power grid conductors disposed substantially parallel with said plurality of substantially parallel linear routing conductors.

7. An apparatus as claimed in claim 6, wherein said standard-cell power conductors comprise a plurality of substantially parallel linear standard cell power conductors disposed substantially parallel with and overlapped by said plurality of substantially parallel linear power grid conductors with said further layer above said plurality of substantially parallel linear standard-cell power conductors.

8. An apparatus as claimed in claim 1, wherein said standard-cell conductor layer is a metal one layer of said integrated circuit.

9. An apparatus as claimed in claim 8, wherein said further layer is a metal two layer of said integrated circuit.

10. An apparatus as claimed in claim 1, wherein said plurality of standard cells comprise said standard-cell power conductors.

11. An apparatus as claimed in claim 1, further comprising a standard-cell layout of said plurality of standard cells in said integrated circuit.

12. An apparatus as claimed in claim 1, wherein a further minimum via spacing requirement applies to spacing between power grid connection vias.

* * * * *